United States Patent [19]
Scott

[11] Patent Number: 5,916,303
[45] Date of Patent: Jun. 29, 1999

[54] OPTIMAL MOVIE DISTRIBUTION ON VIDEO SERVERS IN AN N-LEVEL INTERACTIVE TV SYSTEM

[75] Inventor: Roderick Keith Scott, Durham, N.C.

[73] Assignee: International Business Machines Corporation, Armonk, N.Y.

[21] Appl. No.: 08/861,293

[22] Filed: May 21, 1997

[51] Int. Cl.⁶ ........................................... H04N 7/173
[52] U.S. Cl. .............................. 709/217; 455/6.3; 348/13
[58] Field of Search .................................. 348/1, 3, 7, 12, 348/13; 455/2, 4.2, 5.1, 6.3; 395/200.47, 200.48, 200.49

[56] References Cited

U.S. PATENT DOCUMENTS

| | | |
|---|---|---|
| 5,133,079 | 7/1992 | Ballantyne et al. . |
| 5,291,554 | 3/1994 | Morales . |
| 5,421,031 | 5/1995 | DeBey ........................................ 455/5.1 |
| 5,442,389 | 8/1995 | Blahut et al. . |
| 5,508,732 | 4/1996 | Bottomley et al. . |
| 5,519,435 | 5/1996 | Anderson . |
| 5,544,327 | 8/1996 | Dan et al. . |
| 5,572,645 | 11/1996 | Dan et al. . |
| 5,583,994 | 12/1996 | Rangan .............................. 395/200.09 |
| 5,583,995 | 12/1996 | Gardner et al. ..................... 395/200.09 |
| 5,701,582 | 12/1997 | DeBey ........................................ 455/5.1 |

FOREIGN PATENT DOCUMENTS 0 653 886 A1  5/1995  European Pat. Off. .

OTHER PUBLICATIONS

Ying–Dar Lin, Horng–Zhu Lai and Yuan–Cheng Lai, "A Hierarchical Network Storage Architecture for Video–on Demand Services", IEEE May 1996, pp. 355–364.

Yurdaer N. Doganata and Asser N. Tantawi, "Making a Cost–Effective Video Server", IEEE 1994 pp. 22–30.

*Primary Examiner*—Andrew I. Faile
*Assistant Examiner*—Uyen Le
*Attorney, Agent, or Firm*—John J. Timar; Kelly K. Kordzik

[57] ABSTRACT

Movies are distributed and stored within a movie on demand or near movie on demand system having a number of levels of interconnectivity between and including at least one headend and at least one hub serving a plurality of end users. Distribution is determined as a function of the storage cost of a movie at each level of the system, a connection cost of each level to an end user, and a selection probability of each of the movies. Distribution of the movies between the various servers in the cable system is performed in accordance with the calculated optimal distribution.

13 Claims, 6 Drawing Sheets

OPTIMAL MOVIE DISTRIBUTION ON VIDEO SERVERS IN AN N-LEVEL INTERACTIVE TV SYSTEM

TECHNICAL FIELD

The present invention relates in general to cable TV systems, and in particular, to video on demand and near video on demand systems.

BACKGROUND INFORMATION

One of the important offerings of an interactive cable TV ("ITV") system is providing customers with the opportunity for ordering movies for viewing on their cable-attached televisions. There are two methods of delivering these movies. One is called Video on Demand ("VOD"), where the customer selects a title from a number of movies using a menu on the TV screen, and the movie is presented for immediate viewing. In a variation of the VOD case, a few movies are offered at specific times. This is called Near Video on Demand ("NVOD"). In both cases, the movies must be stored by the cable companies in such a way that customers have access to them. Today, a likely way of providing movies for customer viewing is to digitize them and store them on a form of computer called a video server.

Given the hierarchical nature of a cable system, there are numerous locations that could be used for storing movies. FIG. 1 illustrates the structure of a typical cable TV system. Neighborhoods (cells) are serviced by hubs and the hubs are connected to a headend. Headends could be interconnected and connected upstream to more centralized asset providers (not shown) containing video servers.

FIG. 2 illustrates a generalized system with n levels of interconnectivity. Movies for customer access could be stored in the hubs, the point closest to the customer. This theoretically would have the lowest connectivity costs, but movies of interest would have to be replicated at each hub. Connectivity costs include:

Network equipment
  Switches
  Gateways
  Concentrators
  Routers
  Bridges
  Adapters
  etc.
Costs associated with the physical connection
  Wire
  Fiber optics
  Repeaters
  Transformers
  Receivers
  Satellite dishes
  etc.
Bandwidth and network usage
  Tariffs
  Access charges
  Management overhead
  etc.

An option would be to store movies at the next highest group of nodes in the distribution tree. Connectivity costs would probably be more than for hub connectivity, but the movies would be replicated fewer times. This pattern continues as one moves up the cable system hierarchy towards the headend—higher connectivity costs and lower storage costs.

A cable company operator needs to determine the best way to distribute movie storage to minimize the overall system costs. Assuming connectivity costs are only incurred during movie viewing and connectivity costs rise as the distance from server to user increases, it is practical to assume that the most popular movies should be placed nearest to the customer at the hub. Less popular movies should be stored at higher nodes in the system. The problem becomes one of trading connectivity costs for storage costs, and then determining at what point the minimum overall cost occurs. The prior art has examined this problem by proposing complex models based on network traffic, viewer patterns, and other parameters. This invention proposes a more simple model based on movie popularity, storage costs, and connectivity costs.

SUMMARY OF THE INVENTION

The foregoing need is addressed by the present invention which provides a system and method for determining an optimal distribution of a plurality of movies within N levels of interconnected servers as a function of storage cost, connection cost, and selection probability of the movies.

More specifically, in a system having at least one headend server, and at least one hub server, and N levels of interconnected computer servers between and including the at least one headend server and at least one hub server, the system stores a plurality of movies, receives a storage cost for each one of the plurality movies at each of the levels of the system, receives a connection cost of the each of the levels to an end user, and receives a selection probability of each of the movies. The system then determines the optimal distribution throughout the N levels of interconnected servers as a function of the storage cost, connection cost and selection probability. Movies are then distributed in accordance with the calculated distribution.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 5:
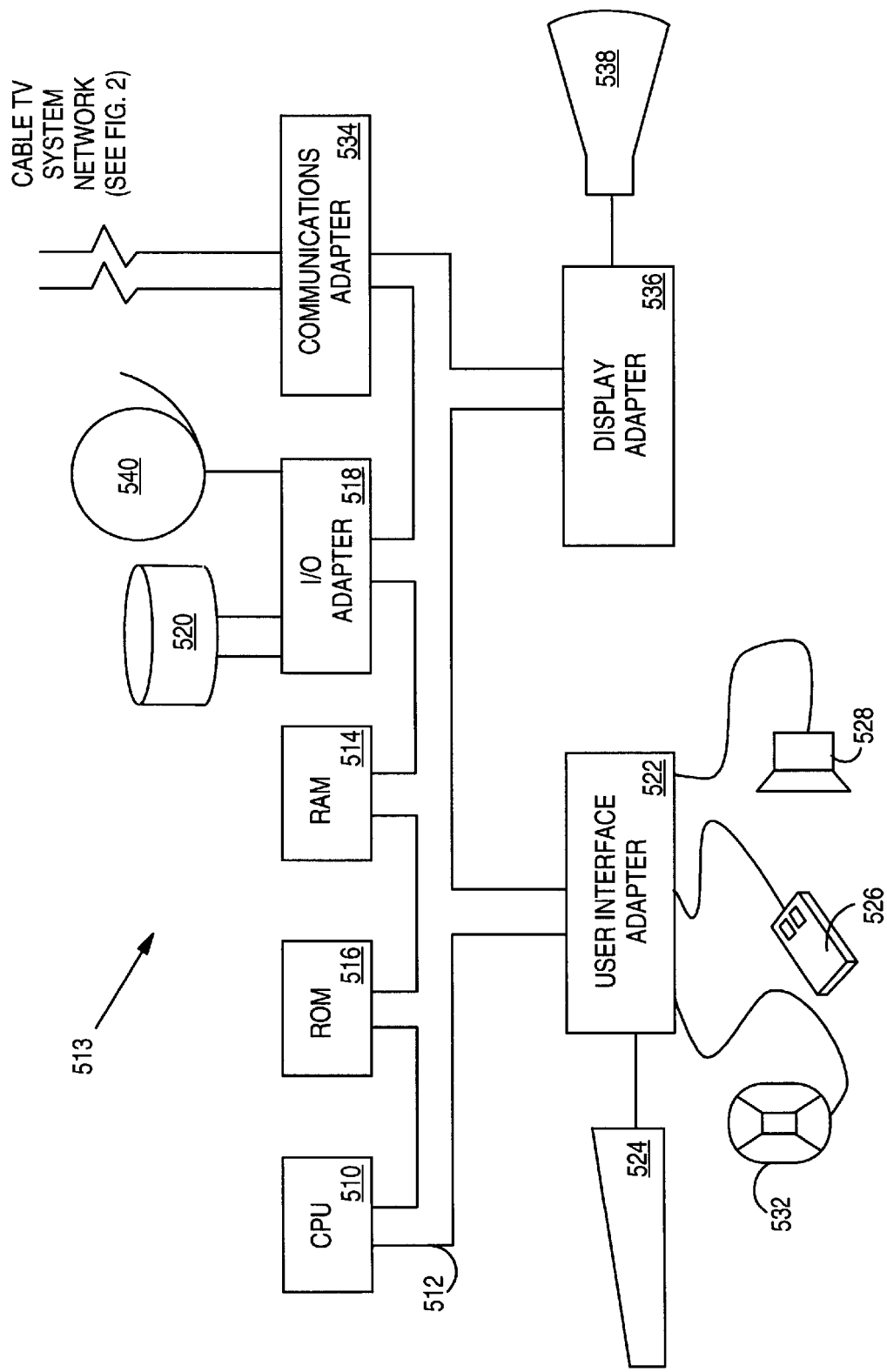
FIG. 5 illustrates a configuration of a server in accordance with the present invention.

A representative hardware environment for practicing the present invention is depicted in FIG. 5, which illustrates a typical hardware configuration of server 513 in accordance with the subject invention having central processing unit (CPU) 510, such as a conventional microprocessor, and a number of other units interconnected via system bus 512. Server 513 includes random access memory (RAM) 514, read only memory (ROM) 516, and input/output (I/O) adapter 518 for connecting peripheral devices such as disk units 520 and tape drives 540 to bus 512, user interface adapter 522 for connecting keyboard 524, mouse 526, speaker 528, microphone 532, and/or other user interface devices such as a touch screen device (not shown) to bus 512, communication adapter 534 for connecting server 513 to a network of such video servers in the system illustrated in FIG. 2, and display adapter 536 for connecting bus 512 to display device 538. CPU 510 may include other circuitry not shown herein, which will include circuitry commonly found within a microprocessor, e.g., execution unit, bus interface unit, arithmetic logic unit, etc. CPU 510 may also reside on a single integrated circuit.

Figure 1:
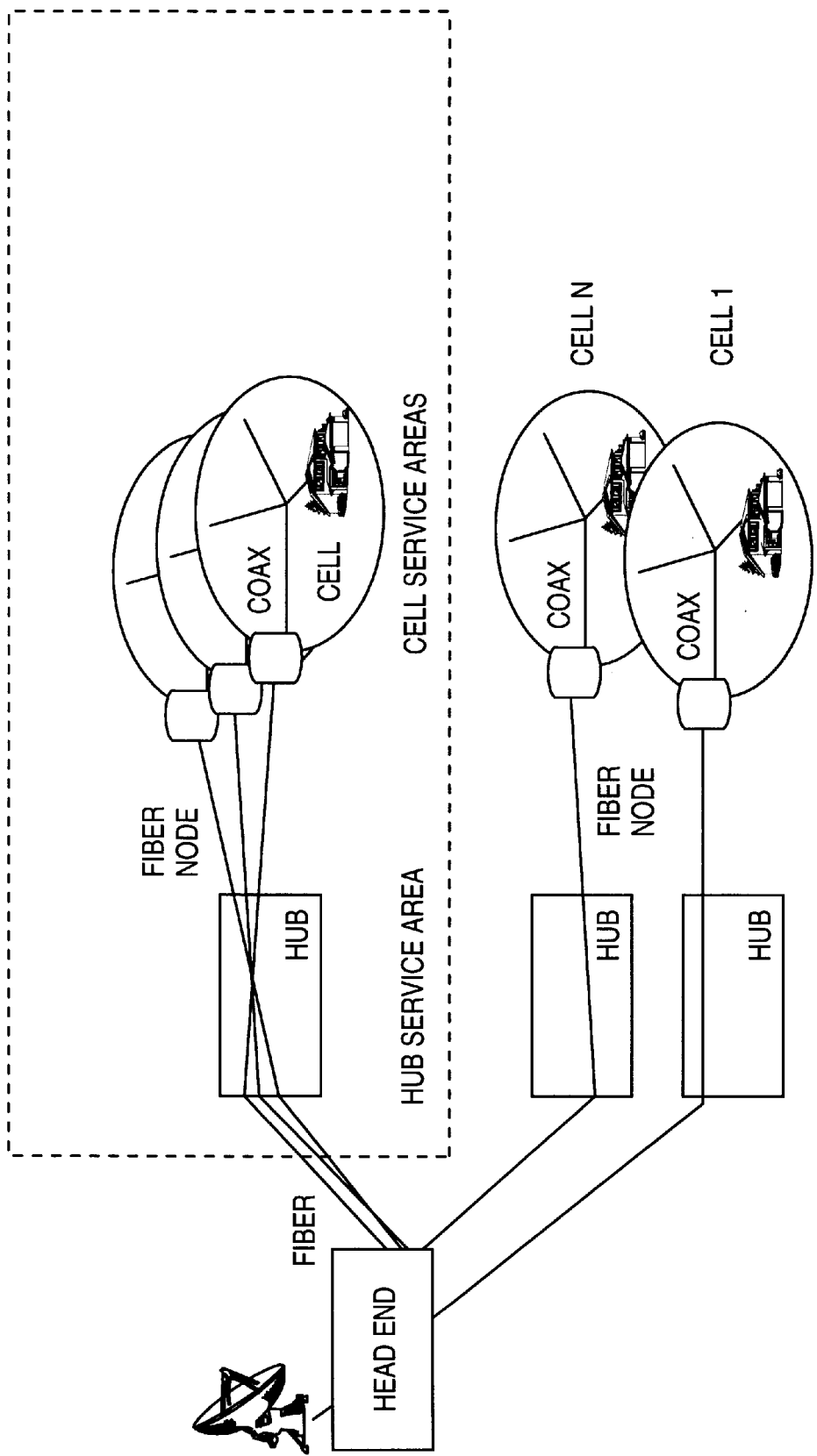
FIG. 1 illustrates a typical cable TV topology.
Figure 2:
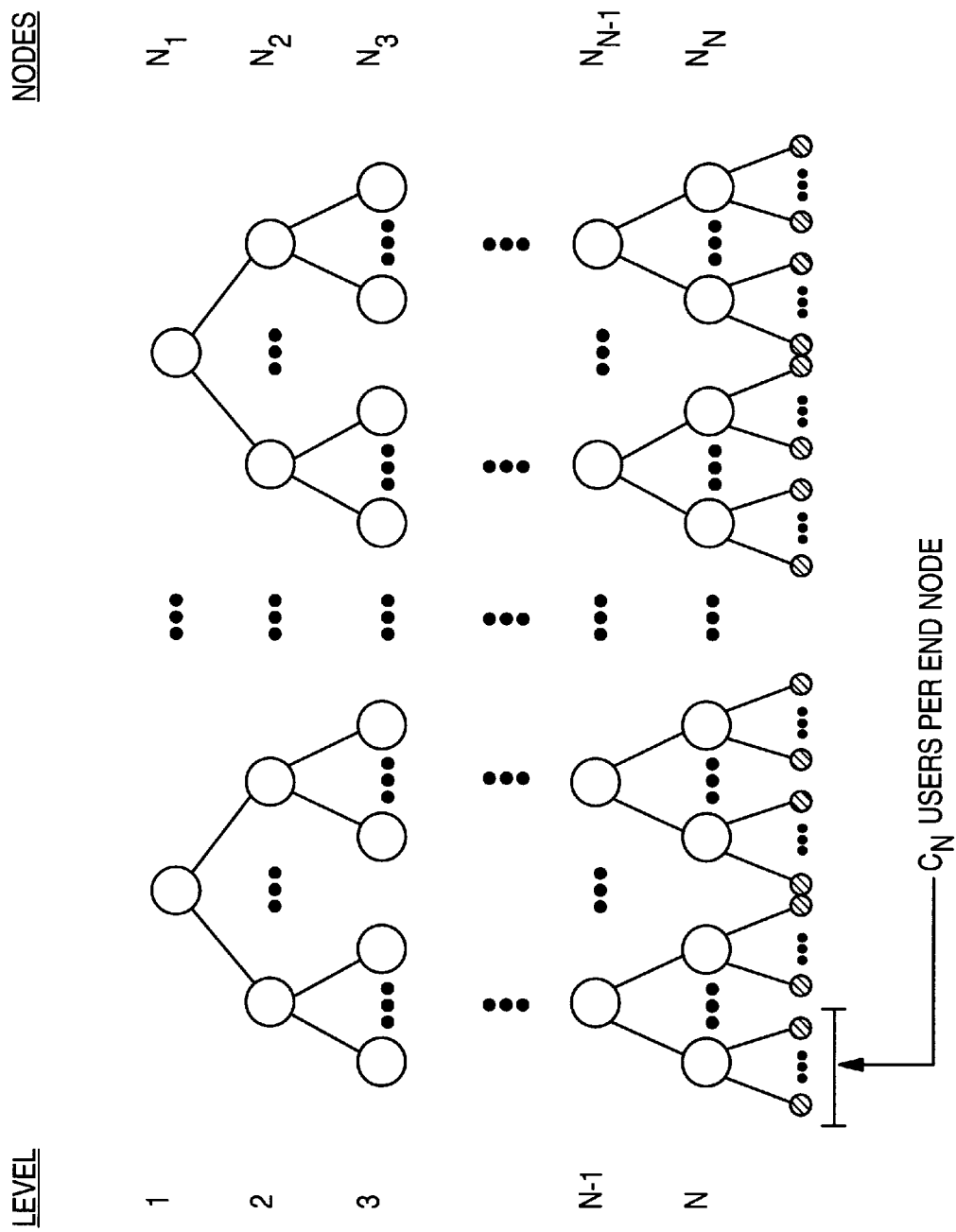
FIG. 2 illustrates an N-level cable TV system.

Server 513 may be located at any one or all of the nodes within the N-level cable TV system illustrated in FIG. 2. Each of servers 513 operates to distribute movies in accordance with the present invention, and specifically in accordance with the process illustrated in FIG. 6, which is further described below. Movies may be digitized and stored within any of the memory and storage means within any one or all of servers 513 in accordance with the distribution calculated in accordance with the present invention. As an example, any one particular movie may be stored within disk drive 520 or tape drive 540 on any particular server 513, and then delivered to an end user in response to a request for the movie from the end user through the communications adapter 534.

Figure 6:
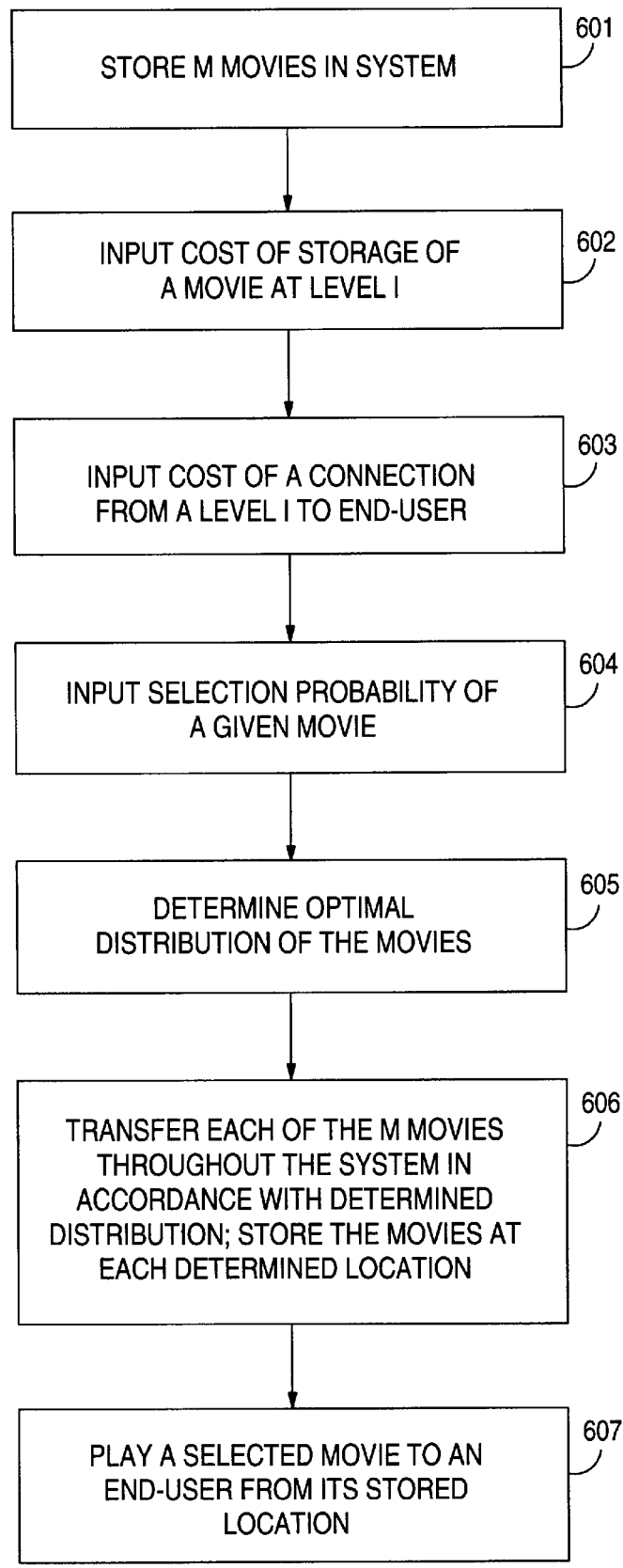
FIG. 6 illustrates a flow diagram of an embodiment of the present invention.

Referring next to FIG. 6, there is illustrated a flow diagram of a process for implementing the present invention. The illustrated process may be embodied in software and/or hardware within each of servers 513. The process begins at step 601, where M movies are stored within the cable TV system using well-known means. As noted above, the movies may be digitized and then stored within any one or a plurality of servers 513. Thereafter, in step 602, the cost of storage of a movie at level i is inputted into the system. Such an input may be performed using any one of the input means coupled to a server 513. Likewise, the cost of a connection from a level i to an end user is inputted into the system in step 603. Additionally, in step 604, the probability of a given movie being selected by an end user is inputted into the system.

Thereafter, in step 605, the optimal distribution of the M movies is determined in accordance with the algorithm further described below. The optimal distribution is determined as a function of the storage cost, connection cost, and selection probabilities inputted in steps 602–604.

Next, in step 606, each of the M movies is transferred and distributed throughout the cable TV system network in accordance with the distribution determined in step 605. The movies are stored at each of the servers 513. In step 607, a selected movie is played to an end user in response to a request from the end user for that particular movie.

The remainder of the discussion will pertain to an implementation of step 605.

The system cost C of implementing video servers in the interactive TV system represented by the illustration in FIG. 2 is composed of two components, $C_d$ the cost of the disk storage, and $C_s$ the cost of the connection stream from that storage to the end user. Hence $$C = C_d + C_s \qquad (1)$$

Assuming the ITV system is implemented in a multi-level hierarchy with the potential of having servers at every level, the total cost for the storage becomes $$C_d = lr \sum_{i=1}^{n} N_i m_i d_i \qquad (2)$$

where n is the number of levels numbered starting from 1 at the root and going to n, the end-user level. $N_i$ is the number of nodes on level i, and $m_i$ is the number of movies stored at each node on the $i^{th}$ level. The average length (duration) of a movie is l, r is the encoding rate, and $d_i$ is the cost of the storage for level i. Assuming that movies are not replicated across levels, M, the total number of unique movies stored in the system is $$M = \sum_{i=1}^{n} m_i \qquad (3)$$

The total cost of the video connections from servers to an end-user is $$C_s = N_n c_n \sum_{i=1}^{n} P_i s_i \qquad (4)$$

where $N_n$ is the number of nodes in the user level and $c_n$ is the number of active connections per node. The probability of selecting a movie stored on the $i^{th}$ level is $P_i$ with the cost of that connection being $s_i$. And, $$\sum_{i=1}^{n} P_i = 1$$

Therefore from equation (1), the total system cost is $$C = C_d + C_s = lr \sum_{i=1}^{n} N_i m_i d_i + N_n c_n \sum_{i=1}^{n} P_i s_i \qquad (5)$$

To find the optimum number of movies to store at each level to minimize the system cost, one needs to find $$\frac{\partial C}{\partial m_i} = 0 \qquad (6)$$

and solve for each $m_i$. This yields a system of nonlinear equations subject to a constraint, the equations being the first derivatives of the cost function with respect to the number of movies at each level. The constraint is that the number of all unique movies on the n levels sums to M as in equation (3).

Figure 3:
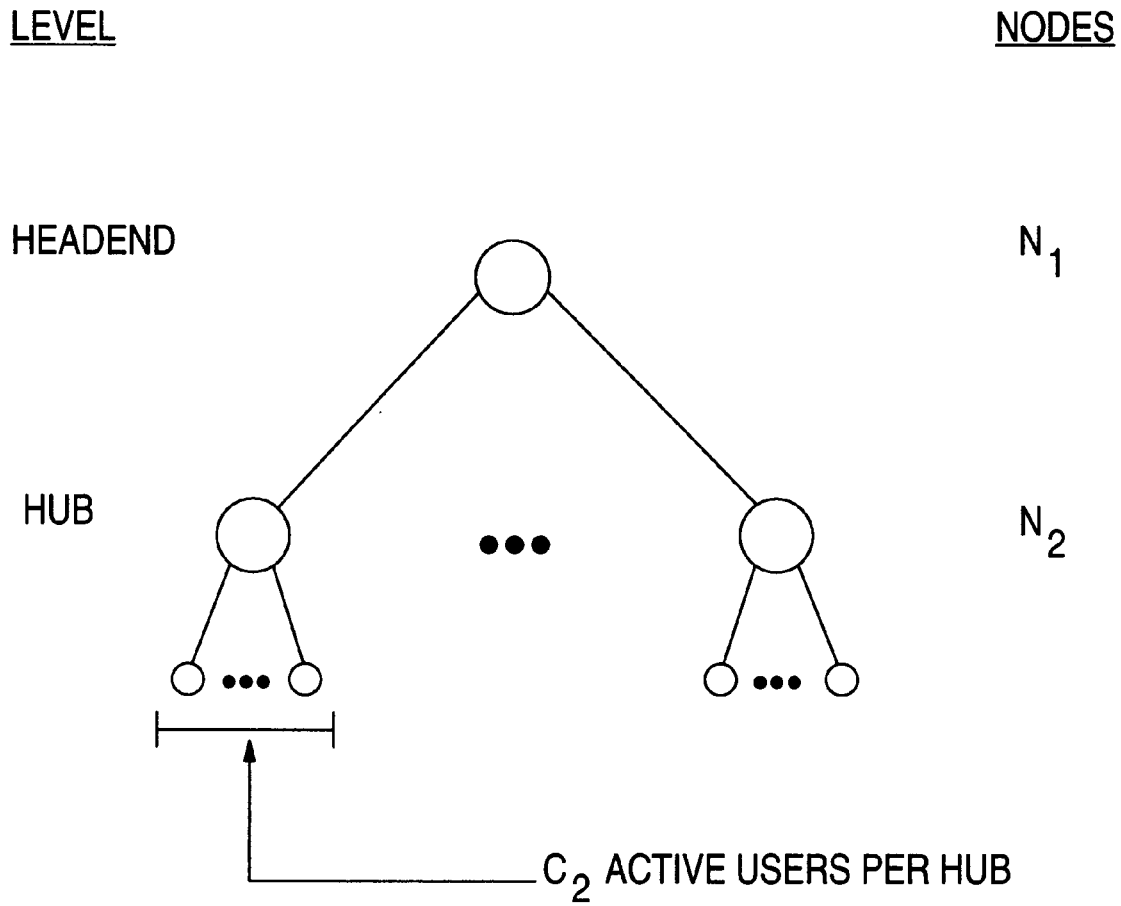
FIG. 3 illustrates a 2-level distributed video server system.

Consider the exemplary 2-level cable system illustrated in FIG. 3. For this example, n=2, equation (5) becomes $$C = lr(N_1 m_1 d_1 + N_2 m_2 d_2) + N_2 c_2 (P_1 s_1 + P_2 s_2) \qquad (7)$$

One challenge of using this model is determining the selection probability of a given movie. An approach is to assume that movie selection follows Zipf's law (please refer to Chen, Y. S. and Chong, P., "Mathematical Modeling of Empirical Laws in Computer Applications: A Case Study," Computer Mathematics Applications, October 1992 and Chervenak, A. L., "Tertiary Storage: An Evaluation of New Applications," PhD thesis, Univ. of California, Berkley, December 1994 for a further discussion of Zipf's law) that is; given M movies of interest, ordered by popularity, the probability of the $i^{th}$ movie being requested is $$z(i) = \frac{Z}{i} \qquad (8)$$

where $$Z = \frac{1}{\sum_{i=1}^{M} \frac{1}{i}} \qquad (9)$$

Assuming Zipfs law applies to this example, $$P_1 = Z \sum_{i=0}^{m_1} \frac{1}{i} \qquad (10)$$

and $$P_2 = 1 - P_1 \qquad (11)$$

Now, simultaneously solve equation (6) for $m_1$, the movies at the headend, and $m_2$, the movies replicated in the hubs, $$\frac{\partial C}{\partial m_1} = 0 \text{ and } \frac{\partial C}{\partial m_2} = 0 \qquad (12)$$

This yields $$m_2 = \frac{N_2 c_2 Z (s_2 - s_1)}{lr(N_1 d_1 - N_2 d_2)} \qquad (13)$$

for M, the total number of movies.

Figure 4:
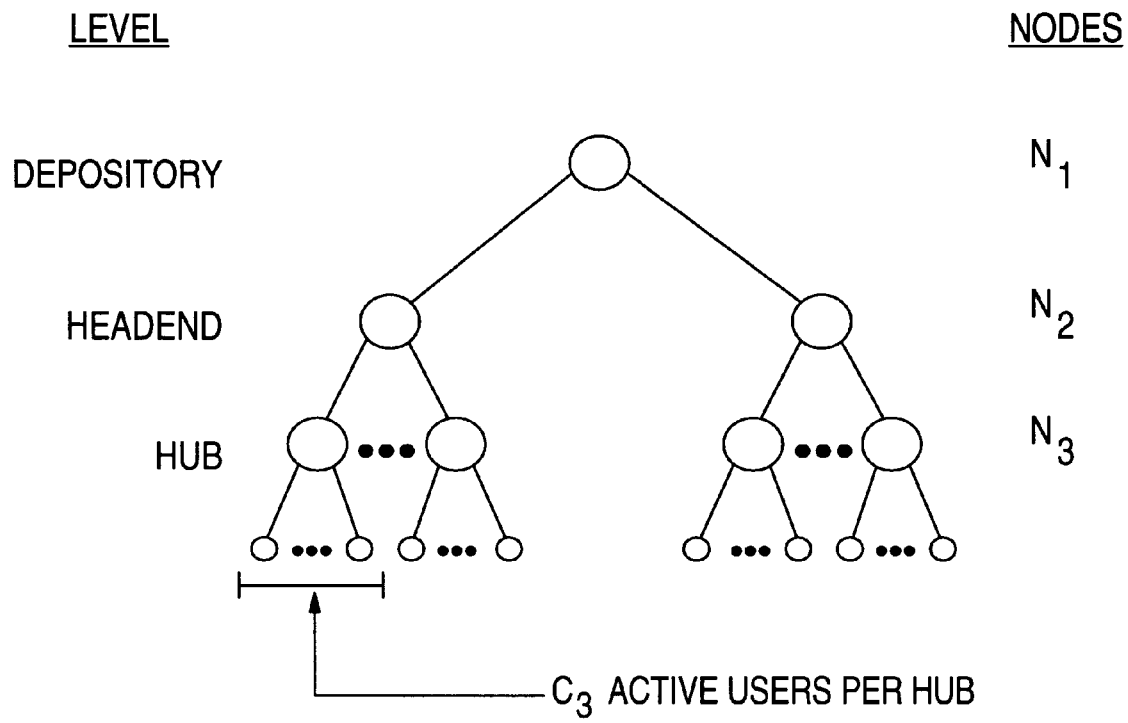
FIG. 4 illustrates a 3-level distributed video server system.

Consider an exemplary three-level server system composed of a central depository, cable headends, and neighborhood hubs as illustrated in FIG. 4. Using the cost equation (5), the cost of such a system is $$lr(N_1 m_1 d_1 + N_2 m_2 d_2 + N_3 m_3 d_3) + N_3 c_3 (P_1 s_1 + P_2 s_2 + P_3 s_3) \qquad (15)$$

Applying Zipf's law and making the suggested approximations:

$$P_1 = Z \sum_{i=0}^{m_1} \frac{1}{i} \approx Z ln(m_1) \qquad (16)$$

$$P_2 = Z \sum_{i=m_1+1}^{m_1+m_2} \frac{1}{i} \approx Z ln\left(\frac{m_1 + m_2}{m_1 + 1}\right) \qquad (17)$$

$$P_3 = Z \sum_{i=m_1+m_2+1}^{m_1+m_2+m_3} \frac{1}{i} \approx Z ln\left(\frac{m_1 + m_2 + m_3}{m_1 + m_2 + 1}\right) \qquad (18)$$

Note that the approximations become more accurate as the $m_i$ become large.

The problem becomes one of solving the system of nonlinear simultaneous equations $$\frac{\partial C}{\partial m_1} = 0, \frac{\partial C}{\partial m_2} = 0, \frac{\partial C}{\partial m_3} = 0 \qquad (19)$$

subject to the constraint $M = m_1 + m_2 + m_3$.

Lagrange's Method (please refer to Taylor, Angus E. and Mann, W. Robert, "Advanced Calculus," Second Edition, John Wiley and Sons, 1972) can be used to find the extremal values of a cost function, $F(x_1, x_2, \ldots, x_n)$ subject to a constraint $G(x_1, x_2, \ldots, x_n)$.

First, form the function $$u = F(x_1, x_2, \ldots, x_n) + \lambda G(x_1, x_2, \ldots, x_n) \qquad (20)$$

where $\lambda$ is Lagrange's multiplier, an unknown constant. Next, form a system of n+1 equations composed of $$\frac{\partial u}{\partial x_1} = 0, \qquad (21)$$

$$\frac{\partial u}{\partial x_2} = 0,$$

$$\vdots$$

$$\frac{\partial u}{\partial x_n} = 0,$$

$$G(x_1, x_2, \ldots, x_n) = K$$

where K is the value of the constraint equation. The solutions $(x_1, x_2, \ldots, x_n, \lambda)$ provide $(x_1, x_2, \ldots, x_n)$ a minimal point of $F(x_1, x_2, \ldots, x_n)$.

The equations rendered by Lagrange's method are often too complex to be solved explicitly so solutions must be obtained numerically. One such approach is Newton's Iterative Method (please refer to Shoup, Terry E., "Numerical Methods for the Personal Computer," Prentice-Hall, Inc., 1983).

Given a set of equations of the form:

$$f_1(x_1, x_2, \ldots, x_n) = 0$$

$$f_2(x_1, x_2, \ldots, x_n) = 0$$

$$f_n(x_1, x_2, \ldots, x_n) = 0 \qquad (22)$$

a solution, $(x_1, x_2, \ldots, x_n)$ is to be found.

First, an initial guess for $(x_1, x_2, \ldots, x_n)$ is made, then that guess is used to solve for the delta matrix in $$\begin{bmatrix} \frac{\partial f_1}{\partial x_1} & \cdots & \frac{\partial f_1}{\partial x_n} \\ & \vdots & \\ \frac{\partial f_n}{\partial x_1} & \cdots & \frac{\partial f_n}{\partial x_n} \end{bmatrix} \begin{bmatrix} \Delta x_1 \\ \vdots \\ \Delta x_n \end{bmatrix} = \begin{bmatrix} -f_1 \\ \vdots \\ -f_n \end{bmatrix} \quad (23)$$

The solutions are used to update the initial guess, $$\hat{x}_1 = x_1 \Delta x_1$$

$$\hat{x}_2 = x_2 + \Delta x_2$$

$$\hat{x}_n = x_n + \Delta x_n \quad (24)$$

The process is repeated until $(x_1, x_2, \ldots, x_n)$ converges, i.e., all $|\Delta x_i|$ become smaller than a desired $\epsilon$.

A modification technique called damped Newton (please refer to Conte, Samuel D. and de Boor, Carl, "Elementary Numerical Analysis: An Algorithmic Approach," McGraw-Hill, 1980) is often used to avoid instabilities in the convergence process. Instead of adding the full value of the correcting $\Delta x_i$'s provided by an iteration of the Newton technique, a fraction of the $\Delta x_i$'s are added $$\hat{x}_i = x_i + \frac{\Delta x_i}{2^j} \text{ for } j = 1, 2, \ldots \quad (25)$$

j is chosen so that the residual error $\delta$ is minimized. The residual error is found by $$\delta = \sqrt{\sum_{i=1}^{n} (-f_i(\hat{x}_i))^2} \quad (26)$$

The F part of equation (20) is the cost of the three-level system (15). The constraint part of equation (20) becomes the sum of the movies at the three levels $$G = m_1 + m_2 + m_3 = M \quad (27)$$

Then, forming u from equation (20):

$$lr(N_1 m_1 d_1 + N_2 m_2 d_2 + N_3 m_3 d_3) \quad (28)$$

$$N_3 c_3 Z \left[ \ln(m_i) s_1 + \ln\left(\frac{m_1 + m_2}{m_1 + 1}\right) s_2 + \ln\left(\frac{m_1 + m_2 + m_3}{m_1 + m_2 + 1}\right) \right],$$

$$\lambda(m_1 + m_2 + m_3 - M)$$

Now, solve $$\frac{\partial u}{\partial m_1} = 0, \frac{\partial u}{\partial m_2} = 0, \frac{\partial u}{\partial m_3} = 0, \text{ and } \frac{\partial u}{\partial \lambda} = 0 \quad (29)$$

for $m_1$, $m_2$, $m_3$, and $\lambda$.

This is done by using Newton's method, iteratively computing $$\hat{m}_1 = m_1 + \frac{\Delta m_1}{2^j} \quad (30)$$

$$\hat{m}_2 = m_2 + \frac{\Delta m_2}{2^j}$$

$$\hat{m}_3 = m_3 + \frac{\Delta m_3}{2^j}$$

$$\hat{\lambda} = \lambda + \frac{\Delta \lambda}{2^j}$$

using $$\begin{bmatrix} \frac{\partial^2 u}{\partial m_1^2} & \frac{\partial^2 u}{\partial m_1 \partial m_2} & \frac{\partial^2 u}{\partial m_1 \partial m_3} & \frac{\partial^2 u}{\partial m_1 \partial \lambda} \\ \frac{\partial^2 u}{\partial m_2 \partial m_1} & \frac{\partial^2 u}{\partial m_2^2} & \frac{\partial^2 u}{\partial m_2 \partial m_3} & \frac{\partial^2 u}{\partial m_2 \partial \lambda} \\ \frac{\partial^2 u}{\partial m_3 \partial m_1} & \frac{\partial^2 u}{\partial m_3 \partial m_2} & \frac{\partial^2 u}{\partial m_3^2} & \frac{\partial^2 u}{\partial m_3 \partial \lambda} \\ \frac{\partial^2 u}{\partial \lambda \partial m_1} & \frac{\partial^2 u}{\partial \lambda \partial m_2} & \frac{\partial^2 u}{\partial \lambda \partial m_3} & \frac{\partial^2 u}{\partial \lambda^2} \end{bmatrix} \begin{bmatrix} \Delta m_1 \\ \Delta m_2 \\ \Delta m_3 \\ \Delta \lambda \end{bmatrix} = \begin{bmatrix} -\frac{\partial u}{\partial m_1} \\ -\frac{\partial u}{\partial m_2} \\ -\frac{\partial u}{\partial m_3} \\ -\frac{\partial u}{\partial \lambda} \end{bmatrix} \quad (31)$$

until all $\Delta m_i$ and $\Delta \lambda < \epsilon$.

As with any numerical process, using Newton's method involves a certain number of practical considerations. For example, a crucial element of getting successful convergence inside the range of allowable solutions is choosing a good set of starting values for the iterative process. An excellent method for finding starting values has been found. Scan through various values of $m_i$, summing to M, and then calculate the cost of that server distribution. Use the one that produces the lowest cost to seed the iterative process. This can be an iterative process, i.e., continually decrease the granularity of the scan routine until successful starting values are selected.

The following is a pseudo code segment for the scan procedure. (It should be noted that for systems with small n and small M, it may be easier to extend this initial guessing procedure to checking all possible distributions explicitly, i.e. increment=1, and not even try to solve the equations numerically.)

```
Choose increment {1 ≤ increment ≤ M}
repeat
    do m₁ = 1 to M by increment
        do m₂ to M by increment
            m₃ = M - m₁ - m₂
            calculate cost
            if cost is minimum thus far, then save(m₁, m₂, m₃)
        end
    end
    use (m₁, m₂, m₃) as starting values
```

Attempt to solve using Newton's Method
  if no convergence, then decrease increment until convergence
  Occasionally during Newton's Method, values for some of the $m_i$'s will oscillate around zero and increase in value while the other values converge. It was found that such oscillation is an indication that the proper value of $m_i$ is zero.

Another situation can occur in which the starting values contain zero or negative values for all but one of the $m_i$'s. It was found that in this case, setting these values to zero and setting the other value to M provided the optimal distribution.

Although the present invention and its advantages have been described in detail, it should be understood that various changes, substitutions and alterations can be made herein without departing from the spirit and scope of the invention as defined by the appended claims.

What is claimed is:

1. A method for distributing and storing movies within a movie on demand or near movie on demand system having i levels of interconnectivity between and including at least one head end and at least one hub serving a plurality of end-users, said method comprising the steps of:

inputting a storage cost of a movie at each level of said system;

inputting a connection cost of each level to an end-user;

inputting a selection probability of each of said movies;

determining an optimal distribution of said movies within said system as a function of said storage cost, said connection cost, and said selection probability; and distributing said movies to various servers in said system in accordance with said determined optimal distribution, wherein said determining step further comprises the step of determining a minimal total storage and connection costs for each possible distribution of said movies in said system, wherein said step of determining said minimal total storage and connection costs for each possible distribution of said movies in said system comprises the step of calculating $$\frac{\partial C}{\partial m_i} = 0$$

wherein $m_i$ is a number of said movies at each server on an ith level, wherein $$C = C_d + C_s = lr \sum_{i=1}^{n} N_i m_i d_i + N_n c_n \sum_{i=1}^{n} P_i s_i, \text{ and}$$

wherein n is a number of levels numbered starting from 1 at a root and going to n, $N_i$ is a number of nodes on level i, $m_i$ is a number of movies stored at each node on the $i^{th}$ level, l is an average length of a movie, r is an encoding rate, and $d_i$ is a cost of storage for level i.

2. The method as recited in claim 1, further comprising the step of playing a selected one of said movies to said end-user in response to a request for said selected one of said movies by said end-user.

3. The method as recited in claim 1, wherein said inputting and determining steps are performed using one or more of said servers in said system.

4. The method as recited in claim 3, wherein each of said servers includes a data processing system comprising a processor and a memory.

5. A data processing system operable for distributing and storing movies within a movie on demand or near movie on demand system having i levels of interconnectivity between and including at least one head end and at least one hub serving a plurality of end-users, said system comprising:

circuitry for receiving a storage cost of a movie at each level of said system;

circuitry for receiving a connection cost of each level to an end-user;

circuitry for receiving a selection probability of each of said movies;

circuitry for determining an optimal distribution of said movies within said system as a function of said storage cost, said connection cost, and said selection probability; and circuitry for distributing said movies to various servers in said system in accordance with said determined optimal distribution, wherein said determining circuitry further comprises circuitry for determining a minimal total storage and connection costs for each possible distribution of said movies in said system, wherein said circuitry for determining said minimal total storage and connection costs for each possible distribution of said movies in said system comprises circuitry for calculating $$\frac{\partial C}{\partial m_i} = 0$$

wherein $m_i$ is a number of said movies at each server on an ith level, wherein $$C = C_d + C_s = lr \sum_{i=1}^{n} N_i m_i d_i + N_n c_n \sum_{i=1}^{n} P_i s_i, \text{ and}$$

wherein n is a number of levels numbered starting from 1 at a root and going to n, $N_i$ is a number of nodes on level i, $m_i$ is a number of movies stored at each node on the $i^{th}$ level, l is an average length of a movie, r is an encoding rate, and $d_i$ is a cost of storage for level i.

6. The system as recited in claim 5, further comprising circuitry for playing a selected one of said movies to said end-user in response to a request for said selected one of said movies by said end-user.

7. The system as recited in claim 5, wherein said receiving and determining circuitry is located in one or more of said servers in said system.

8. A computer program product stored on a storage media and operable for distributing and storing movies within a movie on demand or near movie on demand system having i levels of interconnectivity between and including at least one head end and at least one hub serving a plurality of end-users, said computer program product comprising:

a plurality of binary values for receiving a storage cost of a movie at each level of said computer program product;

a plurality of binary values for receiving a connection cost of each level to an end-user;

a plurality of binary values for receiving a selection probability of each of said movies;

a plurality of binary values for determining an optimal distribution of said movies within said system as a function of said storage cost, said connection cost, and said selection probability; and a plurality of binary values for distributing said movies to various servers in said system in accordance with said determined optimal distribution, wherein said determining circuitry further comprises a plurality of binary values for determining a minimal total storage and connection costs for each possible distribution of said movies in said system, wherein said plurality of binary values for determining said minimal total storage and connection costs for each possible distribution of said movies in said system comprises a plurality of binary values for calculating $$\frac{\partial C}{\partial m_i} = 0$$

wherein $m_i$ is a number of said movies at each server on an ith level, wherein $$C = C_d + C_s = lr\sum_{i=1}^{n} N_i m_i d_i + N_n c_n \sum_{i=1}^{n} P_i s_i, \text{ and}$$

wherein n is a number of levels numbered starting from 1 at a root and going to n, $N_i$ is a number of nodes on level i, $m_i$ is a number of movies stored at each node on the $i^{th}$ level, l is an average length of a movie, r is an encoding rate, and $d_i$ is a cost of storage for level i.

9. The computer program product as recited in claim 8, further comprising a plurality of binary values for playing a selected one of said movies to said end-user in response to a request for said selected one of said movies by said end-user.

10. A system comprising:
at least one head end server;
at least one hub server operable for serving a plurality of end-users;
i levels of interconnected computer servers between and including said at least one head end server and said at least one hub server, wherein said at least one head end server is at level 1, and wherein said hub server is at level i, wherein i is greater than or equal to 2;
circuitry for storing a plurality of movies;
circuitry for receiving a storage cost of a particular one of said plurality of movies at each of said i levels of said system;
circuitry for receiving a connection cost of each of said i levels to an end-user;
circuitry for receiving a selection probability of each of said plurality of movies;
circuitry for determining an optimal distribution of said plurality of movies within said i levels of interconnected servers as a function of said storage cost, said connection cost, and said selection probability; and
circuitry for distributing said plurality of movies to various servers in said i levels of interconnected servers in accordance with said determined optimal distribution, wherein said determining circuitry further comprises circuitry for determining a minimal total storage and connection costs for each possible distribution of said plurality of movies in said i levels of interconnected servers, wherein said circuitry for determining said minimal total storage and connection costs for each possible distribution of said plurality of movies in said i levels of interconnected servers comprises circuitry for calculating $$\frac{\partial C}{\partial m_i} = 0$$

wherein $m_i$ is a number of s aid movies at each server on an ith level, wherein $$C = C_d + C_s = lr\sum_{i=1}^{n} N_i m_i d_i + N_n c_n \sum_{i=1}^{n} P_i s_i, \text{ and}$$

wherein n is a number of levels numbered starting from 1 at a root and going to n, $N_i$ is a number of nodes on level i, $m_i$ is a number of movies stored at each node on the $i^{th}$ level, l is an average length of a movie, r is an encoding rate, and $d_i$ is a cost of storage for level i.

11. The system as recited in claim 10, further comprising circuitry for playing a selected one of said plurality of movies to an end-user in response to a request for said selected one of said plurality of movies by said end-user.

12. A method for distributing and storing movies within a movie on demand or near movie on demand system having i levels of interconnectivity between and including at least one head end and at least one hub serving a plurality of end-users, said method comprising the steps of:
inputting a storage cost of a movie at each level of said system;
inputting a connection cost of each level to an end-user;
inputting a selection probability of each of said movies;
inputting an average length of each said movie;
determining an optimal distribution of said movies within said system as a function of said storage cost, said connection cost, said selection probability, and said average length;
distributing said movies to various servers in said system in accordance with said determined optimal distribution; and
inputting an encoding rate, wherein said determining step also factors in said encoding rate, wherein storage cost equals $$lr\sum_{i=1}^{n} N_i m_i d_i$$

wherein n is a number of levels numbered starting from 1 at a root and going to n, an end-user level, wherein $N_i$ is a number of nodes of level i, and $m_i$ is a number of movies stored at each node on the $i^{th}$ level, wherein an average length of a movie is l, r is the encoding rate, and $d_i$ is a cost of storage for level i.

13. A method for distributing and storing movies within a movie on demand or near movie on demand system having i levels of interconnectivity between and including at least one head end and at least one hub serving a plurality of end-users, said method comprising the steps of:
inputting a storage cost of a movie at each level of said system;
inputting a connection cost of each level to an end-user;
inputting a selection probability of each of said movies;
inputting an average length of each said movie;
determining an optimal distribution of said movies within said system as a function of said storage cost, said connection cost, said selection probability, and said average length; and
distributing said movies to various servers in said system in accordance with said determined optimal distribution, wherein the connection costs equals $$N_n c_n \sum_{i=1}^{n} P_1 s_1$$

where $N_n$ is a number of nodes in a user level and $c_n$ is a number of active connections per node, wherein a probability of selecting a movie stored on an $i^{th}$ level is $P_i$ with a cost of that connection being $s_i$.

* * * * *